United States Patent Office 3,063,914
Patented Nov. 13, 1962

3,063,914
PROCESS FOR THE BIOLOGICAL PREPARATION
OF STREPTOKINASE
Wolfgang von Pölnitz, Frankfurt am Main, Hans Gerhard Schwick, Marburg (Lahn), and Jakob Hermann Bickhard, Gossfelden, Germany, assignors to Behringwerke Aktiengesellschaft, Marburg (Lahn), Germany, a corporation of Germany
No Drawing. Filed Dec. 20, 1960, Ser. No. 77,038
Claims priority, application Germany Dec. 22, 1959
5 Claims. (Cl. 195—66)

The present invention relates to a process for the biological preparation of streptokinase. It is known that the growth of certain bacteria can most favorably be influenced by various culture media. Thus, e.g. the horse broth or beef broth cited by Pope (J. of Path. and Bact. 35, 573 (1932)) were used for the growth of diphtheria bacteria. Also a good formation of diphtheria toxin takes place in said medium by said microorganisms. The medium cited by Müller (W.H.O. Techn. Rep. Ser. 61, 46 (1953)) likewise proved favorable for the manufacture of diphtheria toxin from diphtheria bacteria. For a considerable number of bacteria also simpler culture media proved suitable, e.g. those consisting of meat extract, casein peptone and sugar. The first two substances are to be considered the nitrogen source, whereas sugar is the energy supplier.

If the mentioned culture media are used for cultivating streptokinase forming streptococci, in particular of the strain H46A (identified in American Type Culture Collection, Catalog of Cultures, Sixth Edition, 1958, page 72, as "No. 12449, Rebecca C. Lancefield, strain H46A, 1956"), it will become apparent that, though the growth is moderate, the formation of streptokinase is very low so that an industrial production cannot be based on it.

Moreover, it was known to add polyoxyethylene sorbitane monooleate to the Dubos-medium for the tubercle bacilli in order to avoid bacterial growth in lumps and to ensure an equal distribution of bacteria in the culture medium.

Now, a process for the biological preparation of streptokinase was found, wherein small amounts of non-ionogenic, surface active substances, preferably in concentrations of 0.01% to 0.1%, are added to the culture broths, and the streptokinase is isolated therefrom in known manner, e.g. according to the method described by Christensen, J. R., in J. Clin. Invest. 28, 163 (1949).

Also in view of the above-mentioned known measures, i.e. the addition of polyoxyethylene sorbitan monooleate to cultures of tubercle bacilli for the purpose of an equal distribution of the bacteria in the culture medium, it is surprising that the addition of the cited surface active agents leads to an increased formation of streptokinase— apart from improved growth of the streptococci. Especially in the case of nutrient media on which the streptococci grow well without producing sufficient quantities of streptokinase, the process according to the invention shows distinct merits.

Non-ionogenic, surface active agents that have been found suitable are polyoxyethylene sorbitan monofatty acid esters, such as the monostearate ("Tween 60") and the monooleate ("Tween 80"), alkyl phenol polyglycol ethers or condensation products from ethylene oxide and higher alcohols (e.g. oleyl alcohol, octadecyl alcohol) or from ethylene oxide and fatty acids (castor-oil fatty acid, oleic acid). It is advantageous to add these substances in concentrations of 0.01 to 0.1% to the above-mentioned nutrient media. The following examples illustrate the invention.

*Example 1*

5 flasks of 5 liters each were filled in a sterile manner with a broth prepared according to C. G. Pope and M. L. Smith (J. Path. and Bact. 35, 573 (1932)) by pancreatic digestion of beef meat. Further 5 flasks were filled with the same nutrient medium but with an addition of 0.05% of polyoxyethylene sorbitan monooleate; after heating to 37° C. in an incubator room, the inoculation was effected with a culture of the streptococcus strain H46A and the pH-value was checked after determined time intervals. As soon as an acidification of the nutrient broth took place, the latter was adjusted with sodium hydroxide solution to a pH-value of 7.6.

After termination of the growth, the normal series showed a streptokinase value of 48 Christensen units of streptokinase per cc., whereas the flask series containing polyoxyethylene sorbitan monooleate showed a maximum streptokinase value of 250 Christensen units per cc.

*Example 2*

5 flasks of 5 liters each were filled in a sterile manner with an aqueous medium containing 0.5% of meat extract, 1% of casein peptone—pancreatically digested—and 2% of dextrose, and then adjusted to a pH-value of 7.4. A further series of 5 flasks of 5 liters each, contained the same medium with the addition of 0.05% of polyoxyethylene sorbitan monooleate, likewise adjusted to a pH-value of 7.4. After inoculation with the streptococcus strain H46A and the continuous neutralization of the formed acid, the formation of streptokinase was observed.

With the simple nutrient medium, 10 Christensen units per cc. were found as maximum values; however, in the culture broth containing the cited surface active agent, maximum values of 320 Christensen units per cc. were found.

*Example 3*

One fermenter, which was fed with 100 liters of a medium containing 0.5% of meat extract, 1% of pancreatically digested casein peptone and 2% of dextrose, and another fermenter fed with the same nutrient medium, however with the addition of 0.05% of polyoxyethylene sorbitan monooleate, were inoculated with a culture of streptococcus strain H46A. Continuously formed acid was neutralized.

The determination of the maximum values of the formed streptokinase showed that 350 Christensen units per cc. were found in the culture solution containing the cited surface active agent, whereas in the nutrient broth without the above-mentioned addition only less than 40 units per cc. could be found at most.

*Example 4*

5 flasks containing 5 liters each of a nutrient broth corresponding to that cited by Müller (cf. World Hlth. Org. Techn. Rep. Ser. 61, 46 (1953)) were supplied with 0.05% of polyoxyethylene sorbitan monooleate. Another series of 5 flasks containing the same nutrient broth received no such addition.

After inoculation with the streptococcus strain H46A and continuous neutralization of formed acids 530 Christensen units per cc. were found in the culture broth containing the surface active agents, whereas in the nutrient broth without the above addition only 50 Christensen units per cc. were found.

*Example 5*

One fermenter was fed with 250 liters of a nutrient broth—prepared according to Müller—another fermenter was fed with the same medium but with the addition of 0.05% of polyoxyethylene sorbitan monooleate.

The maximum values of streptokinase obtained after termination of the incubation time and continuous neutralization amounted, with the addition of the surface active agent, to 800 Christensen units of streptokinase per cc., and without the said addition, to 80 Christensen units per cc.

What we claim is:

1. A method for the biological production of streptokinase comprising adding, prior to inoculation, polyoxyethylene sorbitan monooleate to the culture medium of streptokinase-forming streptococci, the concentration of said monooleate being from 0.01% to 0.1% of the culture medium and isolating the streptokinase from said culture medium.

2. A method for the biological production of streptokinase according to claim 1 wherein the concentration of the monooleate added to the culture medium is 0.05%.

3. A method for promoting the biological production of streptokinase which comprises carrying out said production in a culture medium containing from 0.01% to 0.1% of a non-ionogenic surface active agent selected from the group consisting of monobasic fatty acid esters of polyoxyethylene sorbitan, alkyl phenol polyglycol ethers, condensation products of ethylene oxide and higher alcohols and condensation products of ethylene oxide and high molecular weight fatty acids.

4. The method defined in claim 3 wherein the surface active agent is a monobasic fatty acid ester of polyoxyethylene sorbitan.

5. The method as defined in claim 3 wherein the surface active agent is polyoxyethylene sorbitan monooleate.

No references cited.